US011172784B2

United States Patent
Pinelli et al.

(10) Patent No.: US 11,172,784 B2
(45) Date of Patent: Nov. 16, 2021

(54) DUAL REMOVABLE END CAP VESSEL

(71) Applicant: Leapfrog Product Development LLC, Chicago, IL (US)

(72) Inventors: Steven Pinelli, Ogden Dunes, IN (US); Richard Ellison, Chicago, IL (US); Glen Gilmore, Naperville, IL (US); Micaela McCabe, Chicago, IL (US); Kurtis Sward, Anna Maria, FL (US); Derek Leatzow, Chicago, IL (US)

(73) Assignee: Leapfrog Product Development LLC, Chicago, IL (US)

( * ) Notice: Subject to any disclaimer, the term of this patent is extended or adjusted under 35 U.S.C. 154(b) by 274 days.

(21) Appl. No.: 16/004,333

(22) Filed: Jun. 8, 2018

(65) Prior Publication Data

US 2018/0353011 A1   Dec. 13, 2018

Related U.S. Application Data

(60) Provisional application No. 62/516,997, filed on Jun. 8, 2017, provisional application No. 62/522,438, filed on Jun. 20, 2017.

(51) Int. Cl.
*A47J 41/02* (2006.01)
*C25D 7/04* (2006.01)
*A47G 19/22* (2006.01)

(52) U.S. Cl.
CPC .............. *A47J 41/028* (2013.01); *C25D 7/04* (2013.01); *A47G 19/2288* (2013.01)

(58) Field of Classification Search
CPC ............ B65D 81/3841; B65D 81/3869; B65D 81/3881; B65D 1/06; A47J 41/02; A47J 41/022; A47J 41/028
See application file for complete search history.

(56) References Cited

U.S. PATENT DOCUMENTS

| | | | |
|---|---|---|---|
| 4,444,324 A * | 4/1984 | Grenell | B65D 25/04 206/545 |
| 5,153,977 A * | 10/1992 | Toida | B23K 1/001 228/176 |
| D364,810 S | 12/1995 | Meisner | |
| D471,455 S | 3/2003 | Laveault et al. | |
| D485,132 S | 1/2004 | Ohno et al. | |
| D505,294 S | 5/2005 | Gauss | |
| D508,185 S | 8/2005 | Gauss | |

(Continued)

OTHER PUBLICATIONS

Zulu, "Atlas20 oz Glass Water Bottle," accessed on-line at: https://www.zuluathletic.com/shop-all/atlas-glass-water-bottle (available at least as early as Jun. 8, 2018).

(Continued)

*Primary Examiner* — Steven A. Reynolds
*Assistant Examiner* — Javier A Pagan
(74) *Attorney, Agent, or Firm* — Barnes & Thornburg LLP

(57) ABSTRACT

A container includes: a double wall vacuum insulated body including: an electroplated stainless steel inner surface or a polished stainless steel inner surface; an outer surface including a vacuum port; a mouth located at a top end of the body having a mouth diameter; and a base opening located at a bottom end of the body having a base opening diameter; a removable top cap including a top seal that seals the top opening; and a removable bottom cap including a bottom seal that seals the bottom open.

7 Claims, 13 Drawing Sheets

(56) References Cited

U.S. PATENT DOCUMENTS

| | | | |
|---|---|---|---|
| D515,357 S | 2/2006 | Ward et al. | |
| D528,862 S | 9/2006 | Li | |
| D533,061 S | 12/2006 | Li | |
| D564,841 S | 3/2008 | Clemens et al. | |
| D579,722 S | 11/2008 | Sakulsacha et al. | |
| D581,727 S | 12/2008 | Pinelli et al. | |
| D592,456 S | 5/2009 | Pinelli et al. | |
| D592,905 S | 5/2009 | Pinelli et al. | |
| D592,913 S | 5/2009 | Pinelli et al. | |
| 7,546,933 B2 | 6/2009 | Pinelli | |
| D609,964 S | 2/2010 | Lane | |
| D643,249 S | 8/2011 | Miller et al. | |
| 7,997,442 B2 | 8/2011 | Pinelli | |
| D655,580 S | 3/2012 | Kotani | |
| D656,787 S | 4/2012 | Phillips et al. | |
| D661,945 S | 6/2012 | Eyal | |
| D675,060 S | 1/2013 | Lane | |
| 8,360,267 B1 | 1/2013 | Chiou et al. | |
| D686,871 S | 7/2013 | Lane | |
| D693,629 S | 11/2013 | Miller | |
| D693,630 S | 11/2013 | Hurley et al. | |
| 8,579,133 B2 | 11/2013 | Marcus et al. | |
| 8,590,731 B2 | 11/2013 | Pinelli | |
| D700,012 S | 2/2014 | Hurley et al. | |
| D700,802 S | 3/2014 | Miller | |
| 8,978,906 B2 | 3/2015 | Feeley et al. | |
| D725,966 S | 4/2015 | Boroski et al. | |
| D739,183 S | 9/2015 | Lane | |
| 9,266,643 B2 | 2/2016 | Marcus et al. | |
| D758,189 S | 6/2016 | Roth et al. | |
| D758,790 S | 6/2016 | Boroski | |
| D780,578 S | 3/2017 | Lane et al. | |
| D785,402 S | 5/2017 | Shirley et al. | |
| D793,804 S | 8/2017 | Herbst et al. | |
| D794,453 S | 8/2017 | Boroski et al. | |
| D795,011 S | 8/2017 | Pisarevsky | |
| D799,898 S | 10/2017 | Yao | |
| D802,993 S | 11/2017 | Joseph et al. | |
| D804,903 S | 12/2017 | Mason et al. | |
| D804,904 S | 12/2017 | Noveletsky et al. | |
| D808,220 S | 1/2018 | Burns et al. | |
| D809,384 S | 2/2018 | Best et al. | |
| D814,398 S | 4/2018 | Yasunaga | |
| D817,713 S | 5/2018 | Lin | |
| D818,767 S | 5/2018 | Nezu | |
| D821,136 S | 6/2018 | Silsby et al. | |
| D821,137 S | 6/2018 | Boroski | |
| D821,815 S | 7/2018 | Chung | |
| D822,427 S | 7/2018 | Sorensen et al. | |
| D831,425 S | 10/2018 | Best et al. | |
| D831,433 S | 10/2018 | Fleischhut | |
| D835,939 S | 12/2018 | Yee et al. | |
| D839,044 S | 1/2019 | Potter et al. | |
| D848,787 S | 5/2019 | Tatsukawa et al. | |
| D853,181 S | 7/2019 | Stanton | |
| D853,784 S | 7/2019 | Wu | |
| D865,457 S | 11/2019 | Kotani | |
| D869,230 S | 12/2019 | Hao | |
| D870,509 S | 12/2019 | Bo | |
| 2010/0288723 A1* | 11/2010 | Mayer | B65D 1/06 215/316 |
| 2011/0089059 A1 | 4/2011 | Lane et al. | |
| 2011/0204048 A1* | 8/2011 | Carino | B65D 21/083 220/4.03 |
| 2012/0241446 A1* | 9/2012 | Schwartz | B65D 7/04 220/4.21 |
| 2012/0312832 A1 | 12/2012 | Lane | |
| 2013/0213978 A1* | 8/2013 | Libourel | A47J 41/02 220/592.27 |
| 2014/0091097 A1* | 4/2014 | Lane | B65D 81/3837 220/592.2 |
| 2014/0339177 A1 | 11/2014 | Lane | |
| 2015/0158657 A1* | 6/2015 | Olson | B23K 31/02 220/592.27 |
| 2015/0282654 A1 | 10/2015 | Kurabe et al. | |
| 2016/0066746 A1* | 3/2016 | Chaudhry | A47J 36/06 220/573.2 |
| 2017/0280919 A1* | 10/2017 | He | A47J 31/44 |
| 2017/0297785 A1 | 10/2017 | Maruyama et al. | |

OTHER PUBLICATIONS

Kor, "Vida Bottle—25oz," accessed on-line at: https://waterbottles.com/kor-vida-bottle-25-oz (available at least as early as Jun. 8, 2018).

Thermos, "Hydration Bottle with Rotating Intake Meter, 24oz," accessed on-line at: https://www.thermos.com/genuine-thermos-brand-hydration-bottle-with-rotating-intake-meter-24oz.html (available at least as early as Jun. 8, 2018).

Thermos, "Shaker Bottle with Integrated Mixer, 24oz," accessed on-line at: https://www.thermos.com/genuine-thermos-brand-shaker-bottle-with-integrated-mixer-24oz-clear-green-accents.html (available at least as early as Jun. 8, 2018).

Tervis, "Custom Water Bottle," accessed on-line at: https://www.tervis.com/turtle-sunset-stainless-steel-24oz-stainless-water-bottle-1362572.html (available at least as early as June 8, 2018).

Swell, "Bottles," accessed on-line at: https://www.swell.com/shop/swell/bottles/ (available at least as early as Jun. 8, 2018).

Tritan, "32 oz Soft Straw Plastic Water Bottle," accessed on-line at: http://www.pogogear.com/32oz-tritan-straw (available at least as early as Jun. 8, 2018).

Tritan, "32oz Chug Plastic Water Bottle," accessed on-line at: http://www.pogogear.com/32oz-tritan-chug (available at least as early as Jun. 8, 2018).

Tritan, "18oz Chug Plastic Water Bottle," accessed on-line at: http://www.pogogear.com/18oz-tritan-chug (available at least as early as Jun. 8, 2018).

Ello, "chi 24oz BPA-Free Tritan Plastic Water Bottle," accessed on-line at: https://www.elloproducts.com/water-bottles/chi-24oz-plastic-water-bottle (available at least as early as Jun. 8, 2018).

Ello, "Dash 16oz 2pk Tritan Plastic Water Bottles," accessed on-line at: https://www.elloproducts.com/kids/dash-16oz-tritan-plastic-water-bottle (available at least as early as Jun. 8, 2018).

Ello, "Cru Stemless Wine glass Set with Silicone Protection," accessed on-line at: https://www.elloproducts.com/tumblers/cru-stemless-wine-glass-set-with-silicone-protection (available at least as early as Jun. 8, 2018).

Aladdin, "Water Bottle," (1 page) (available at least as early as Jun. 8, 2018).

Ello, "Elsie 22oz Glass Water Bottle," accessed on-line at: https://www.elloproducts.com/water-bottles/elsie-22oz-glass-water-bottle (available at least as early as Jun. 8, 2018).

Ello, "Beacon 24oz Vacuum Insulated Stainless Tumbler," accessed on-line at: https://www.elloproducts.com/tumblers/beacon-24oz-vacuum-insulated-stainless-tumbler (available at least as early as Jun. 8, 2018).

Ello, "Rise 12oz Vacuum Insulated Stainless Steel Tumbler with Optional Straw," accessed on-line at: https://www.elloproducts.com/kids/rise-12oz-vacuum-insulated-stainless-steel-tumbler (available at least as early as Jun. 8, 2018).

Ello, "Hammertime 18oz Stainless Steel Travel Mug," accessed on-line at: https://www.elloproducts.com/travel-mugs/hammertime-18oz-vacuum-insulated-stainless-steel-travel-mug (available at least as early as Jun. 8, 2018).

Ello, "Pure 20oz Glass Water Bottle," accessed on-line at: https://www.elloproducts.com/water-bottles/pure-20oz-glass-water-bottle (available at least as early as Jun. 8, 2018).

Ello, "Max 12oz Vacuum-Insulated Stainless Steel Kids Water Bottle," accessed on-line at: https://www.elloproducts.com/kids/max-12oz-vacuum-insulated-stainless-steel-kids-water-bottle (available at least as early as Jun. 8, 2018).

Ello, "Syndicate 20oz Glass Water Bottle," accessed on-line at: https://www.elloproducts.com/water-bottles/syndicate-20oz-glass-water-bottle (available at least as early as Jun. 8, 2018).

Mason, "Glass Jar," (1 page) (available at least as early as Jun. 8, 2018).

(56) References Cited

OTHER PUBLICATIONS

Camelbak, "Eddy+ 1L Bottle," accessed on-line at: https://www.camelbak.com/en/bottles/R02056—Eddy_75L_2019?color=6bbd0584f3a64b0eb30d406f7e03797e (available at least as early as Jun. 8, 2018).
Contigo, "Autoseal West Loop 2.0 Stainless," accessed on-line at: https://www.gocontigo.com/20-oz-autoseal-west-loop-stainless-travel-mug-with-easy-clean-lid.html (available at least as early as Jun. 8, 2018).
Contigo, "Autospout Straw Striker Chill," accessed on-line at: https://www.gocontigo.com/14-oz-autospout-striker-kids-water-bottle.html (available at least as early as Jun. 8, 2018).
Zojirushi, "Travel Mug SM-YAE48," accessed on-line at: https://www.zojirushi.com/app/product/smyae (available at least as early as Jun. 8, 2018).
Zojirushi, "Stainless Mug SM-KC3648," accessed on-line at: https://www.zojirushi.com/app/product/smkc (available at least as early as Jun. 8, 2018).
Zojirushi, "Stainless Bottle SJ-JS10," accessed on-lien at: https://www.zojirushi.com/app/product/sjjs (available at least as early as Jun. 8, 2018).
Zojirushi, "Flip-and-Go Stainless Mug SM-QHE48/60," accessed on-line at: https://www.zojirushi.com/app/product/smqhe (available at least as early as Jun. 8, 2018).
Zojirushi, "Stainless Mug SM-TAE48SA, Ichimatsu Collection," accessed on-line at: https://www.zojirushi.com/app/product/smtae (available at least as early as Jun. 8, 2018).
Zojirushi, "Stainless Mug SM-TA36/48/60," accessed on-line at: https://www.zojirushi.com/app/product/smta (available at least as early as Jun. 8, 2018).
Zojirushi, "Stainless Mug SM-SE36/48/60," accessed on-line at: https://www.zojirushi.com/app/product/smse (available at least as early as Jun. 8, 2018).
Zojirushi, "Stainless Mug SM-SD36/48/60," accessed on-line at: https://www.zojirushi.com/app/product/smsd (available at least as early as Jun. 8, 2018).
Zojirushi, "Stainless Mug SM-SHE48/60," accessed on-line at: https://www.zojirushi.com/app/product/smshe (available at least as early as Jun. 8, 2018).
Zojirushi, "Stainless Mug SM-KHE36/48," accessed on-line at: https://www.zojirushi.com/app/product/smkhe (available at least as early as Jun. 8, 2018).
Zojirushi, "Stainless Mug SM-SC36/48/60" accessed on-line at: https://www.zojirushi.com/app/product/smsc (available at least as early as Jun. 8, 2018).
Zojirushi, "Stainless Mug SM-PC20/30," accessed on-line at: https://www.zojirushi.com/app/product/smpc (available at least as early as Jun. 8, 2018).
Zojirushi, "Stainless Mug SM-PB30/34," accessed on-line at: https://www.zojirushi.com/app/product/smpb (available at least as early as Jun. 8, 2018).
Migo, "Enjoy Sport Water Bottle," accessed on-line at: https://www.pinterest.ru/pin/12666442685646757/ (available at least as early as Jun. 8, 2018).
Coleman, "Switch SS," accessed on-line at: https://www.coleman.com/all-camp-kitchen/drinkware/switch-ss/col_2038485_pr/COL_2038485 (available at least as early as Jun. 8, 2018).
Corkcicle, "Classic Arctican," accessed on-line at: https://corkcicle.com/products/classic-arctican?variant=475182759951 (available at least as early as Jun. 8, 2018).
Ello, "Reflext Beverage Container," (1 page) (available at least as early as Jun. 8, 2018).
https://www.zuluathletic.com/shop-all/atlas-glass-water-bottle.
https://waterbottles.com/kor-vida-bottle-25-oz.
https://www.thermos.com/genuine-thermos-brand-hydration-bottle-with-rotating-intake-meter-24oz.html.
https://www.thermos.com/genuine-thermos-brand-shaker-bottle-with-integrated-mixer-24oz-clear-green-accents.html.
https://www.tervis.com/turtle-sunset-stainless-steel-24oz-stainless-water-bottle-1362572.html.
https://www.swell.com/shop/swell/bottles/.
http://www.pogogear.com/32oz-tritan-straw.
http://www.pogogear.com/32oz-tritan-chug.
http://www.pogogear.com/18oz-tritan-chug.
https://www.elloproducts.com/water-bottles/chi-24oz-plastic-water-bottle.
https://www.elloproducts.com/kids/dash-16oz-tritan-plastic-water-bottle.
https://www.elloproducts.com/tumblers/cru-stemless-wine-glass-set-with-silicone-protection.
Aladdin Water Bottle (1 page).
https://www.elloproducts.com/water-bottles/elsie-22oz-glass-water-bottle.
https://www.elloproducts.com/tumblers/beacon-24oz-vacuum-insulated-stainless-tumbler.
https://www.elloproducts.com/kids/rise-12oz-vacuum-insulated-stainless-steel-tumbler.
https://www.elloproducts.com/travel-mugs/hammertime-18oz-vacuum-insulated-stainless-steel-travel-mug.
https://www.elloproducts.com/water-bottles/pure-20oz-glass-water-bottle.
https://www.elloproducts.com/kids/max-12oz-vacuum-insulated-stainless-steel-kids-water-bottle.
https://www.elloproducts.com/water-bottles/syndicate-20oz-glass-water-bottle.
Mason Glass Jar (1 page).
https://www.camelbak.com/en/bottles/R02056—Eddy_75L_2019?color=6bbd0584f3a64b0eb30d406f7e03797e.
https://www.gocontigo.com/20-oz-autoseal-west-loop-stainless-travel-mug-with-easy-clean-lid.html.
https://www.gocontigo.com/14-oz-autospout-striker-kids-water-bottle.html.
https://www.zojirushi.com/app/product/smyae.
https://www.zojirushi.com/app/product/smkc.
https://www.zojirushi.com/app/product/sjjs.
https://www.zojirushi.com/app/product/smqhe.
https://www.zojirushi.com/app/product/smtae.
https://www.zojirushi.com/app/product/smta.
https://www.zojirushi.com/app/product/smse.
https://www.zojirushi.com/app/product/smsd.
https://www.zojirushi.com/app/product/smshe.
https://www.zojirushi.com/app/product/smkhe.
https://www.zojirushi.com/app/product/smsc.
https://www.zojirushi.com/app/product/smpc.
https://www.zojirushi.com/app/product/smpb.
https://www.pinterest.ru/pin/12666442685646757/.
https://www.coleman.com/all-camp-kitchen/drinkware/switch-ss/col_2038485_pr/COL_2038485.
https://corkcicle.com/products/classic-arctican?variant=475182759951.
ELLO Reflext Beverage Container (1 page).

* cited by examiner

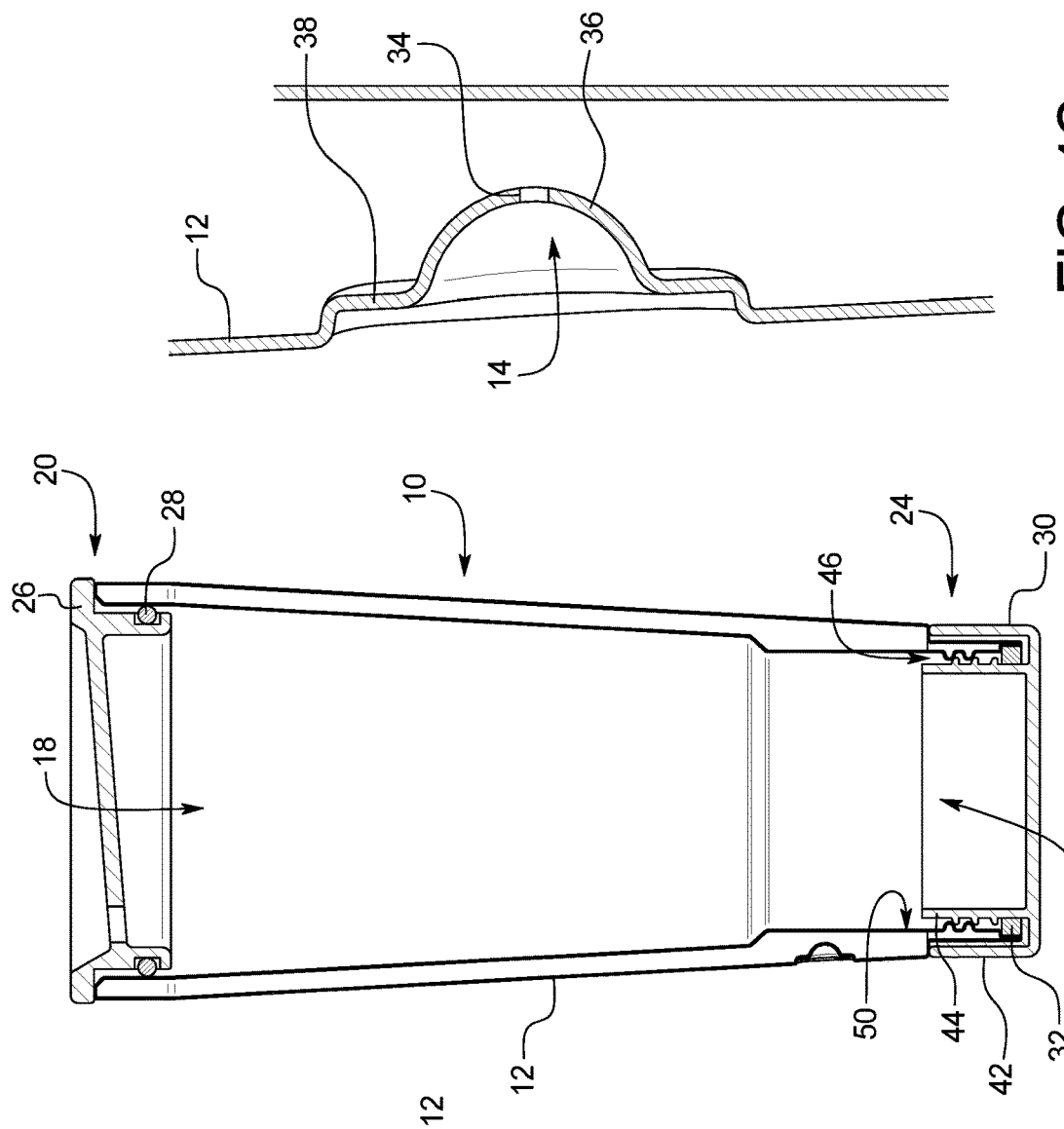
FIG. 4C
FIG. 4B
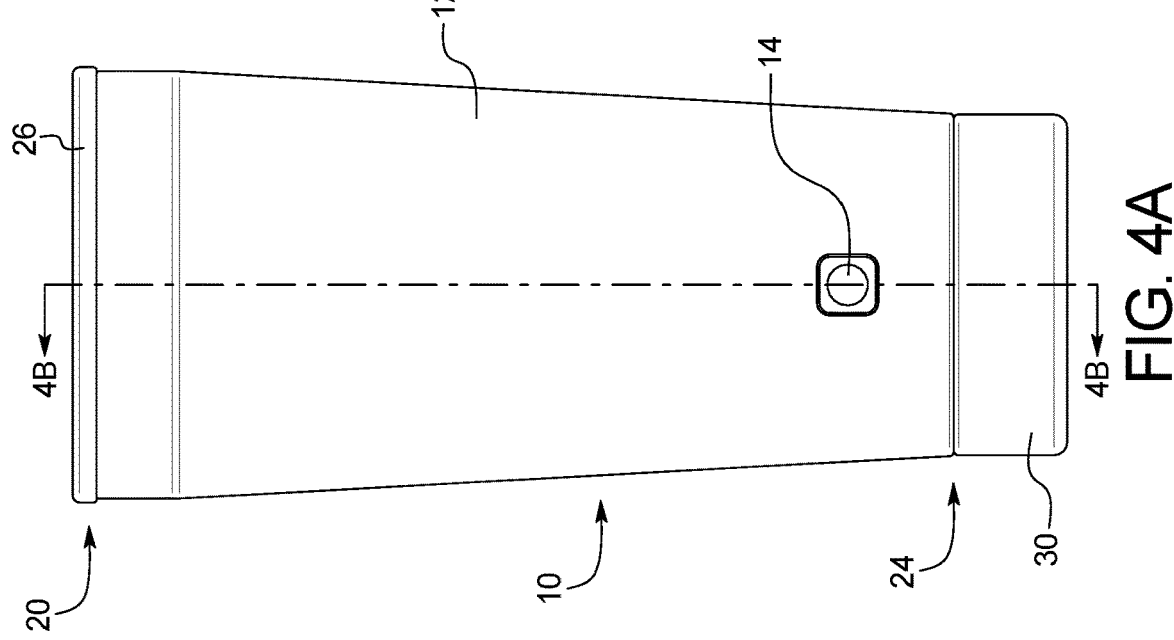
FIG. 4A

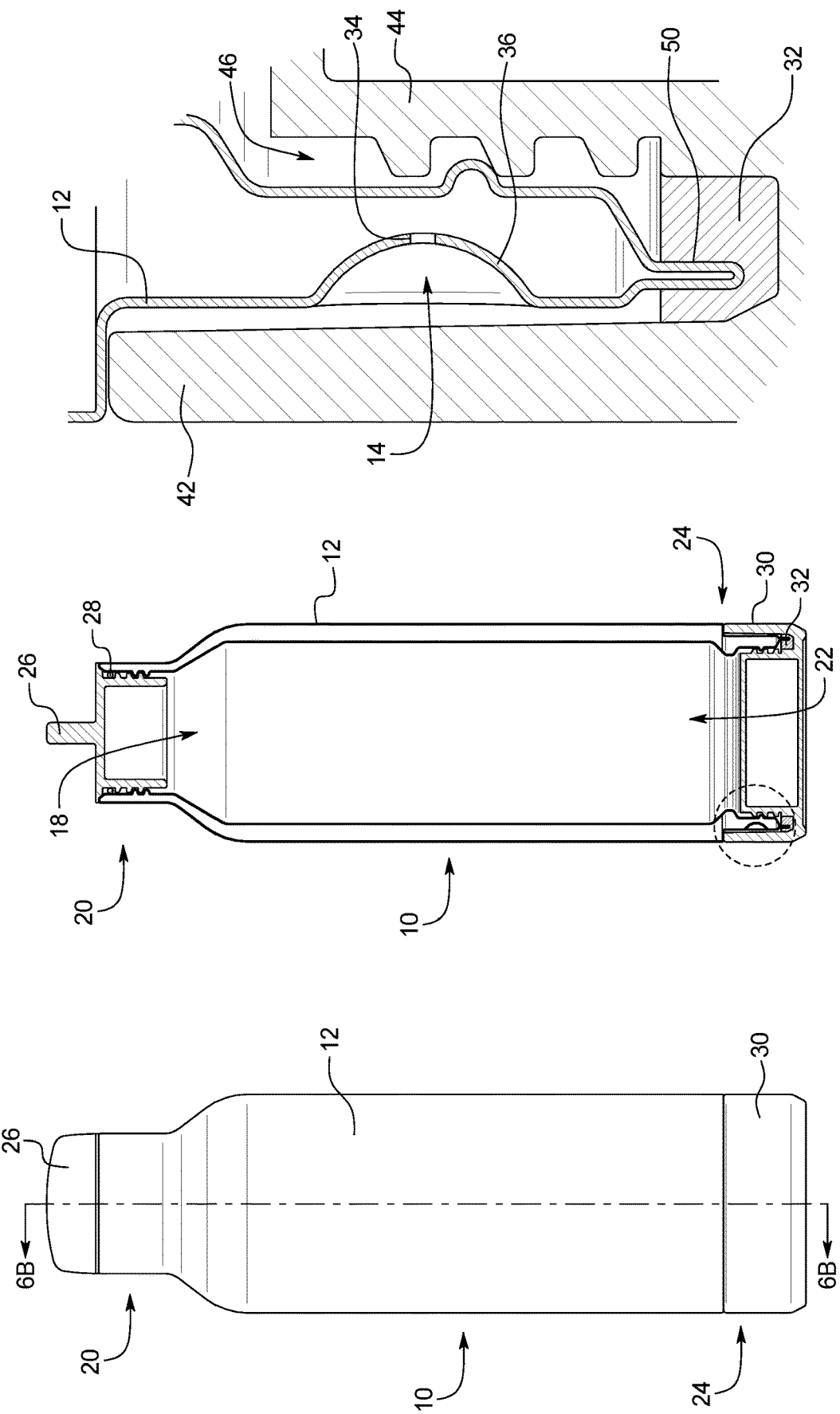

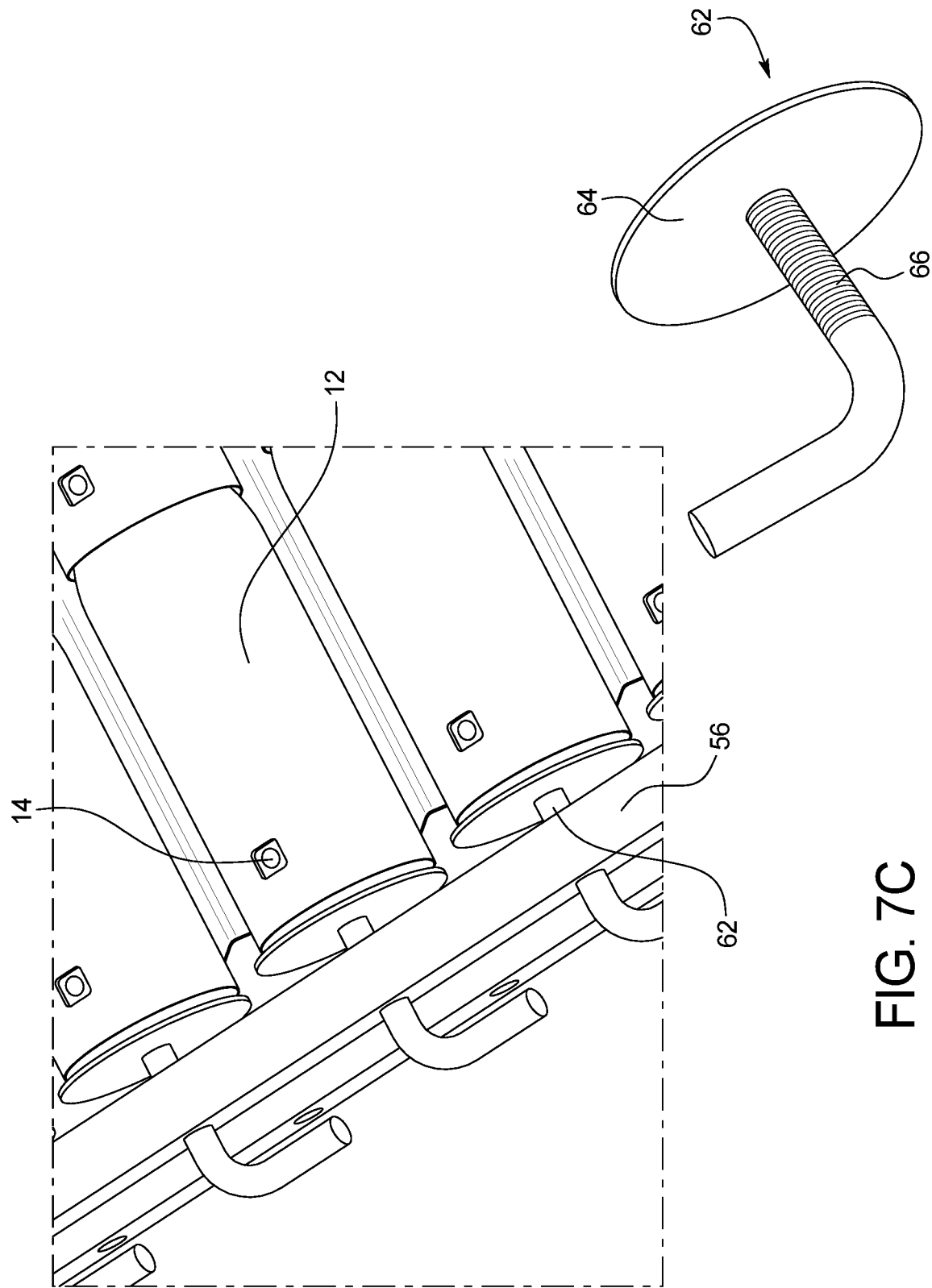

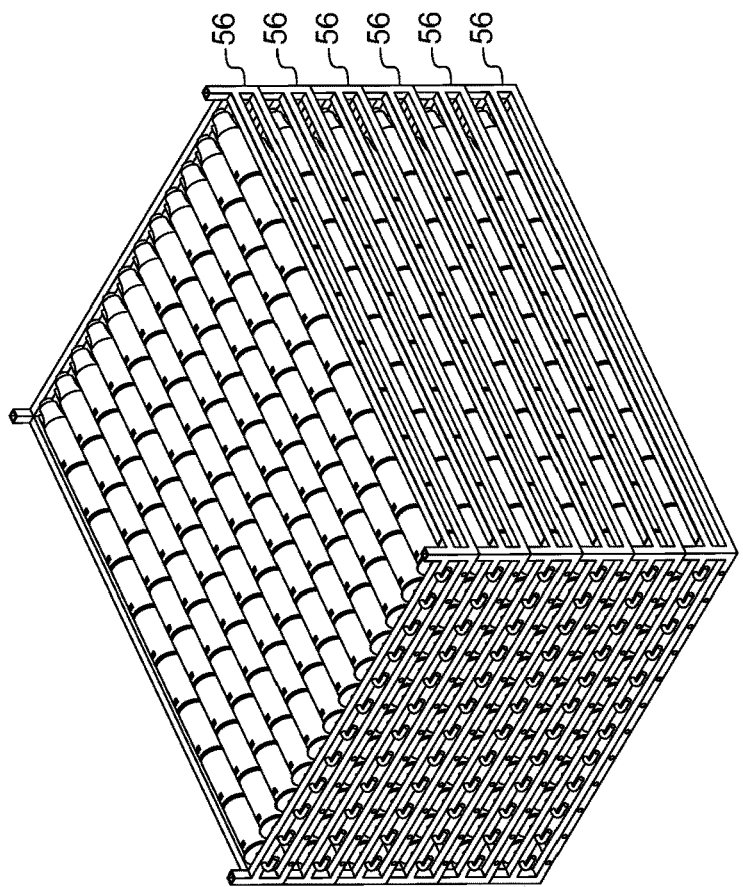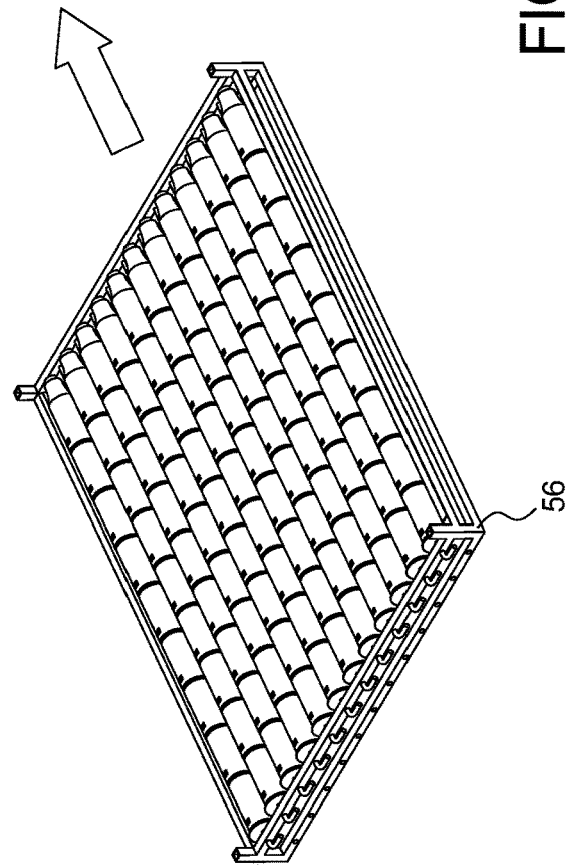
FIG. 7D

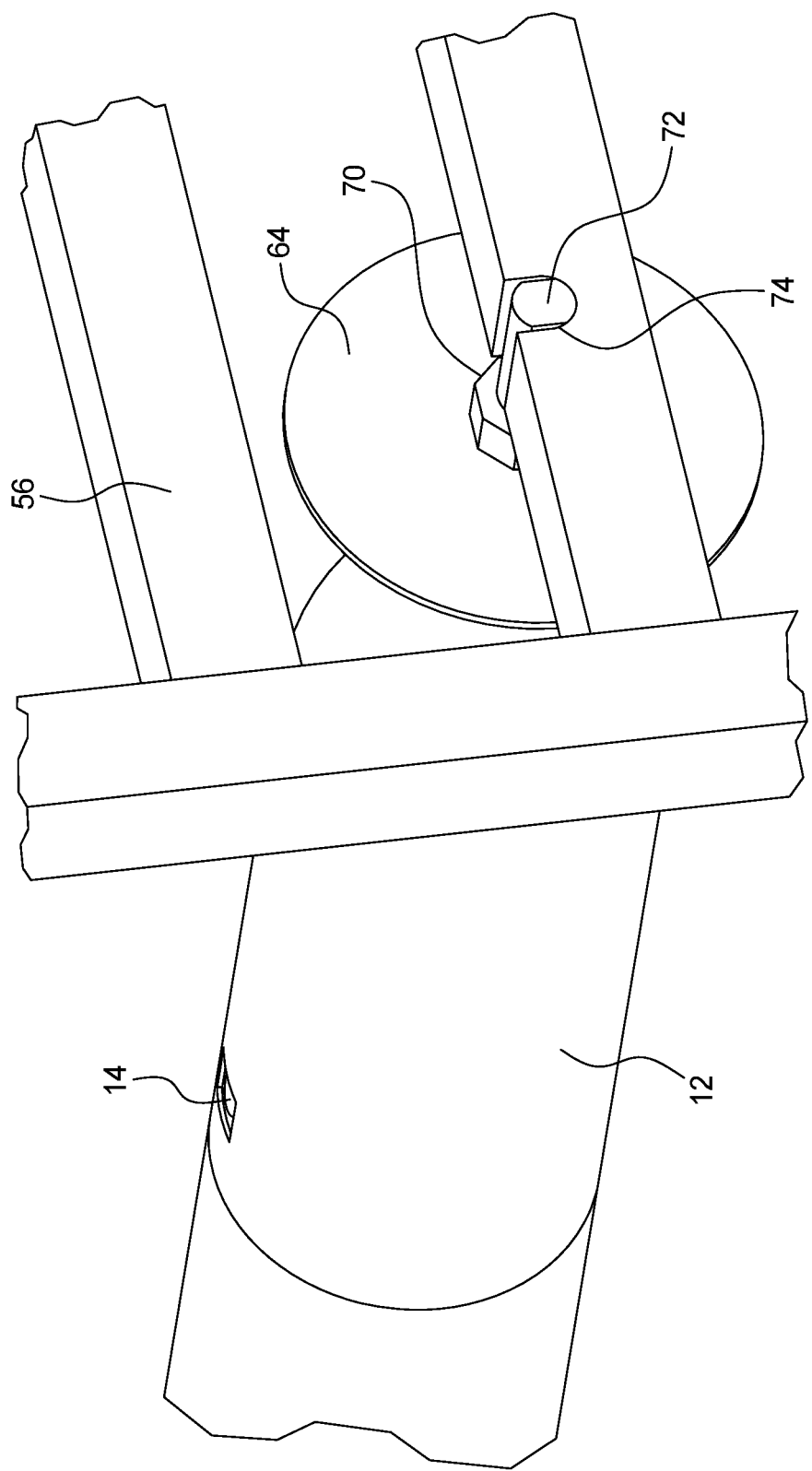

DUAL REMOVABLE END CAP VESSEL

BACKGROUND OF THE INVENTION

The present subject matter relates to insulated beverage containers. More specifically, the present subject matter provides a double wall, vacuum insulated, stainless steel beverage container in which both the top end and the bottom end of the container mate with removable, resealable end caps thereby providing an insulated container in which both ends may be removed for more easily cleaning the interior of the container.

It is often difficult to clean the inside bottom area of double wall, vacuum insulated, stainless steel products, such as reusable beverage containers, bottles, mugs, tumblers, etc. One of the major complications is that the interior of the chamber is only accessible through the mouth of the container—even a dishwasher cannot clean the inner chamber effectively because it cannot flush water and soap through the product (i.e., there is only one opening). In addition, many double wall, vacuum insulated, stainless steel products have small mouth openings to make it easier to drink, which makes the cleaning situation even more difficult as it further restricts access to the interior of the container.

One way that people clean these containers is by using a long brush whose bristles compress to fit through the small mouth opening and reach all the way to the bottom of the container. However, this approach requires a special brush and is less convenient (and potentially less consistent) than using an automatic dishwasher. Also, it is hard to see inside the product to know if the inside of the product has been fully cleaned or is still dirty. Obviously, failure to clean thoroughly results in unwanted sanitary issues.

Double wall, vacuum insulated, stainless steel products previously have used vacuum ports located at the bottom/base of the product as a passage during the manufacturing process to pull a vacuum in the double wall structure. However, there have been two standard methods used to create vacuum insulation of double walled, stainless steel vessels, and the configuration of the vacuum ports are different between the two methods. Each method is described further below.

The older of the two methods used a venting tube welded to the bottom of the stainless steel outer body that provided fluid communication to the space between the double walls. The vessel was then heated. As the vessel heated up, the air between the two stainless steel walls expanded and escaped the vessel through the open tube at the bottom. Once the process reached the maximum temperature, the tube was crimped to prevent further airflow in or out of the space between the double walls, and the vessel cooled down to an ambient temperature. Due to the evacuation of the air between the double walls through the tube while heating, a lower density of air remained between the two stainless steel walls than the ambient conditions, thereby providing insulation between the two walls.

The newer of the two methods used a combination of heat and vacuum to draw a vacuum between the two walls through an open vent located at the base of the vessel. In this process, the container was placed in a heated vacuum chamber. The heat caused air from between the double walls to escape through the vent and, additionally, a vacuum pump further drew air from the chamber, facilitating an even greater amount of air to be removed from between the double wall structure. Each container was placed in the heated vacuum chamber upside-down in a rack with a melt bead placed in the vent hole. The melt bead did not initially fit snugly into the hole, so air could escape around the melt bead during the first portion of the vacuum and heating process. However, once the temperature inside the vacuum chamber reached an appropriate threshold, the melt bead melted and sealed the vacuum port. Since there was very little air left between the two walls at the end of this process, there was even greater insulation using this method than the previous method.

Because the previous methods for manufacturing double wall, vacuum insulated, stainless steel products only provided for a single removeable end cap, it was very difficult to polish the inner surface of the container body. While the outer body was easily polished on a polishing wheel, the inner body could not be polished directly since it was not possible to get inside the body of the vessel with a polishing wheel. Instead, an electroplating process is used in which the product was held at the bottom with a cathode and an anode was inserted into the product along with a chemical solution to finish the inside surface of the inner body.

There was a double wall, vacuum insulated, bottle that had a removable neck portion that was made from a combination of plastic and stainless steel; however, the neck portion did not include vacuum insulation. The removable neck allowed for the user to add ice cubes into the product, and it allowed for better visibility for the user to see if the inside of the product is dirty. However, the lack of insulation along the neck was a detriment to the product's performance and, as with other double wall, vacuum insulated, bottles, it did not allow water and soap to flow through the internal length of the body which would be necessary for optimal cleaning, especially in a dishwasher.

Accordingly, there is a need for a method for manufacturing a double wall, vacuum insulated, stainless steel beverage container in which both the top end and the bottom end of the container mate with removable, resealable end caps thereby providing an insulated container in which both ends may be removed for more easily cleaning the interior of the container and for more easily polishing the inner surface of the body during the manufacturing process.

BRIEF SUMMARY OF THE INVENTION

To meet the needs described above and others, the present disclosure provides a double wall, vacuum insulated, stainless steel vessel in which both the top end and the bottom end of the container mate with removable, resealable end caps, (e.g., a removable base and a removable lid).

Although the body of the vessel in the present disclosure is a double wall, vacuum insulated, stainless steel body, the removable end caps may not be double wall, vacuum insulated. Instead, in a preferred embodiment, the lid and the base may be insulated using an expanded polystyrene foam insulation or similar insulating material.

In a primary embodiment, the vessel includes a vacuum port located on the exterior surface of the side of the double wall body. The vacuum port needs to be located in the body of the vessel, rather than in the base where it would be located in previous double wall vacuum vessels, because the base cannot be both used to provide a vacuum port to insulate the body and be removeable. Thus, the body of the vessel is the only location in which the port may located when the lid and base are both removable.

The vacuum port is initially open during the manufacturing process, then a vacuum is pulled between the walls of the double wall body and the vacuum port is sealed, thereby creating the insulated body. The vacuum port may be located in the central portion of the external surface of the side of the double wall body or it may be located along either portion of the body that is to be covered by one of the removable end caps. For example, the vacuum port may be located near the bottom of the body and covered by the removable base when the base is sealed to the body.

The reason for locating the vacuum port on the exterior surface of the body is because the inner surface should be as smooth and polished as possible to assist in maintaining the cleanliness of the vessel. Thus, the inner surface of the body should be as consistent and uninterrupted a surface as possible. However, it is understood that it is possible to locate the vacuum port on the interior surface, or another location besides the preferred location along the exterior surface of the body.

The present subject matter also provides methods of manufacturing a double wall, vacuum insulated, stainless steel vessel including a vacuum port in the side of the double wall body. This new vessel configuration requires a new method of manufacture in which a plurality of vessels may be securely positioned on their sides during the vacuum drawing process. Accordingly, the present disclosure provides a fixture (e.g., a rack) for aligning and holding the vessels in place during this process.

For example, a vacuum rack fixture may be provided that securely aligns a plurality of bodies on their sides (i.e., horizontally) during the vacuum drawing process. In a first example, a rack is provided that includes multiple layers of sheet metal or wire mesh shelves that include rows of channels onto which the vessels are aligned. The channels help keep the vessels in place and aligned. However, the shelf may be alternatively configured without channels to provide a surface onto which a series of vessels may be supported and held in place. In yet another example, the rack may not include shelves, but rather may use a series of rods onto which the vessels are loaded and held in place.

In each embodiment, the vessels can be nested along each channel/rod, with the open vacuum port aligned to face upward. An end cap may be used at one end or both ends of each row such that the end cap(s) may be tightened against the row of vessels to secure the entire row in place and hold the vessels with their vacuum ports aligned, as desired. In one example, an end cap may be threaded through the frame of the rack to exert a stabilizing force against the row of vessels as it is tightened. In another example, one or more end caps may be threaded onto the rod running through the series of vessels to exert a stabilizing force against the row of vessels as they are tightened.

In instances in which a rod or similar object is used to hold the vessels, the rod and the frame may have mating shapes such that the rod is held in place and prevented from rotating in place. For example, the rod may have a square cross-section and the frame may have square shaped cutouts into which the rods may be securely fit to prevent rotation. Of course, other keyed shapes may be used to prevent rotation or otherwise secure such rods in place along the frames.

In yet another example, the vessels can be held in place on a vacuum rack fixture by clips. There may be dedicated clips for each individual vessel, or a set of clips may hold a set of nested vessels. In another example, each vessel may be held in place by fitting into an individual mold or cutout. Any fixture that holds the vessels in place can be a benefit to the processes described herein.

Once the bodies are secured with their vacuum ports aligned, the racks of vessels can be processed to create the vacuum insulation between the double wall structures. For example, a melt bead may be placed on top of each vacuum port such that the melt bead does not completely block air from leaving the space from within the double wall. Then when the vessels on the racks are heated (with or without an additional vacuum being pulled in the environment in which the racks are located to increase the vacuum effect), the melt beads melt to seal the vent holes of their respective vacuum ports.

It is important to note that special fixturing is not necessary to create the vessels described herein. In one embodiment, the vessels are simply packed onto a rack and loaded into a vacuum chamber without fixturing. Although not using special fixturing makes the process more difficult and error-prone, because the vessels can roll around, if the vessels are packed together so as to minimize their movement, the process described above may still work to an acceptable degree.

As noted above, the inner surface of the body should be as smooth and polished as possible to assist in maintaining the cleanliness of the vessel. Because the vessel body is open at both the top and the bottom, it is easier to polish the inner surface of the body than previous double wall, vacuum insulated, stainless steel containers. Accordingly, the inner surface may simply be polished stainless steel. Alternatively, a temporary lid or base may be attached to the body such that the inner surface may be more easily electroplated, a process that is commonly used with existing double wall, vacuum insulated, stainless steel containers.

In a preferred embodiment, a container includes: a double wall vacuum insulated body including: an electroplated stainless steel inner surface or a polished stainless steel inner surface; an outer surface including a vacuum port; a mouth located at a top end of the body, the mouth having a mouth diameter; and a base opening located at a bottom end of the body, the base opening having a base opening diameter; a removable top cap including a top seal that seals the mouth; and a removable bottom cap including a bottom seal that seals the base opening.

In some examples, the bottom cap includes an inner body around which the bottom seal is located, and an outer body spaced apart from the inner body to form a channel that receives the base opening. In some examples, the bottom seal includes at least one compressible element extending from the inner body towards the outer body thereby sealing along the inner surface of the double wall vacuum insulated body. In some examples, the vacuum port is covered by the outer body of the removable bottom cap when the removable bottom cap is attached to the double wall vacuum insulated body. In other examples, the vacuum port is visible along the double wall vacuum insulated body when the removable bottom cap is attached to the double wall vacuum insulated body.

The mouth diameter may be smaller than the base opening diameter, larger than the base opening diameter, or the same size as the base opening diameter. In some examples, the body includes a shoulder that tapers to a narrower diameter towards the mouth and a larger diameter towards the base opening.

Because the container can be opened at both ends, a pressurized stream of water entering the double wall vacuum insulated body through either the mouth or the base opening can have a clear path to exit the double wall vacuum insulated body through the other when both caps are removed.

In one example, a method of forming a stainless steel, double wall, vacuum insulated body including a mouth and a base opening includes the steps of: providing a stainless steel, double wall body including an air-filled chamber between an inner wall and an outer wall, a mouth located at a top end of the body, a base opening located at a bottom end of the body, and a vacuum port providing fluid communication from an outer surface of the outer wall to the air-filled chamber; positioning the body such that the vacuum port faces in the opposite direction of a primary gravity force; positioning a melt bead on the vacuum port; heating the body such that air escapes the air-filled chamber as the melt bead melts and seals the vacuum port, thus lowering the air-pressure within the air-filled chamber as compared to an ambient room temperature air-pressure; and electroplating or polishing an inner surface of the inner wall of the body. In instances in which the inner surface of the inner wall of the body is electroplated, either the mouth or the base opening may be sealed with a stainless steel cover to facilitate the electroplating process.

In some examples, the air-pressure within the air-filled chamber is further lowered by pulling a vacuum through the vacuum port at the time at which the melt bead melts and seals the vacuum port.

In some examples, the method further includes the step of providing a removable top cap including a top seal that seals the mouth opening and a removable bottom cap including a bottom seal that seals the base opening. In some examples, the step of providing a removable bottom cap includes providing a bottom cap that includes an inner body around which the bottom seal is located, and an outer body spaced apart from the inner body to form a channel that receives the base opening. The step of providing a removable bottom cap may include providing a bottom seal that includes at least one compressible element extending from the inner body towards the outer body thereby sealing along the inner surface of the double wall vacuum insulated body.

The method may further include the step of covering the vacuum port by the outer body of a removable bottom cap when the removable bottom cap is attached to the double wall vacuum insulated body. In other examples, the method may further include the step of not covering the vacuum port by the outer body of a removable bottom cap when the removable bottom cap is attached to the double wall vacuum insulated body.

An object of the present invention is to provide a well-insulated beverage container in which both the lid and base can be removed to make it easier to clean the container.

Another object of the present invention is to provide a well-insulated beverage container in which the inner surface may be polished to make it easier to clean after use.

Another object of the invention is to provide a beverage container including a narrower mouth opening and wider base opening (each with removable caps) that enables a user to invert the container to fill it with ice and a beverage, then seal the bottom with the removeable base, before drinking from the narrower mouth.

A further object of the invention is to provide one or more fixtures that enable a plurality of double wall bodies with vacuum ports located on their sides to be vacuum insulated simultaneously in a group.

An advantage of the present invention is that it provides a double wall, vacuum insulated, stainless steel beverage container that opens at both ends to facilitate easier and more effective cleaning in a dishwasher.

A further advantage of being able to open the container from both ends is that it is also easier to wash the vessel by hand with a brush or scrubber.

Yet another advantage of the present invention is that it allows ice to be more easily added to the vessel through a wider base opening, even while providing a smaller, more optimally flow-controlled, drink opening.

Still another advantage of the present invention is that appropriate fixtures are provided to facilitate the production of the vacuum insulated stainless steel bodies for the vessels.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The figures depict embodiments of the subject matter presented herein and are offered as examples only, not as limitations, as will be appreciated by those skilled in the art.

FIG. 4A is a side view of the container shown in FIG. 3A.

FIG. 4B is a cross-sectional view of the container shown in FIG. 4A.

FIG. 4C is a cross-sectional detail of the view shown in FIG. 4B.

FIG. 6A is a side view of the container shown in FIG. 5A.

FIG. 6B is a cross-sectional view of the container shown in FIG. 6A.

FIG. 6C is a cross-sectional detail of the view shown in FIG. 6B.

FIG. 7C is perspective view of a plurality of end caps threaded through a fixture frame for holding rows of containers in place.

FIG. 7D is a perspective view of a fixture frame holding a plurality of racks of containers.

FIG. 8D is a perspective view of the rod shown in FIG. 8C keyed into a frame of a fixture.

Figures 1A, 1B:
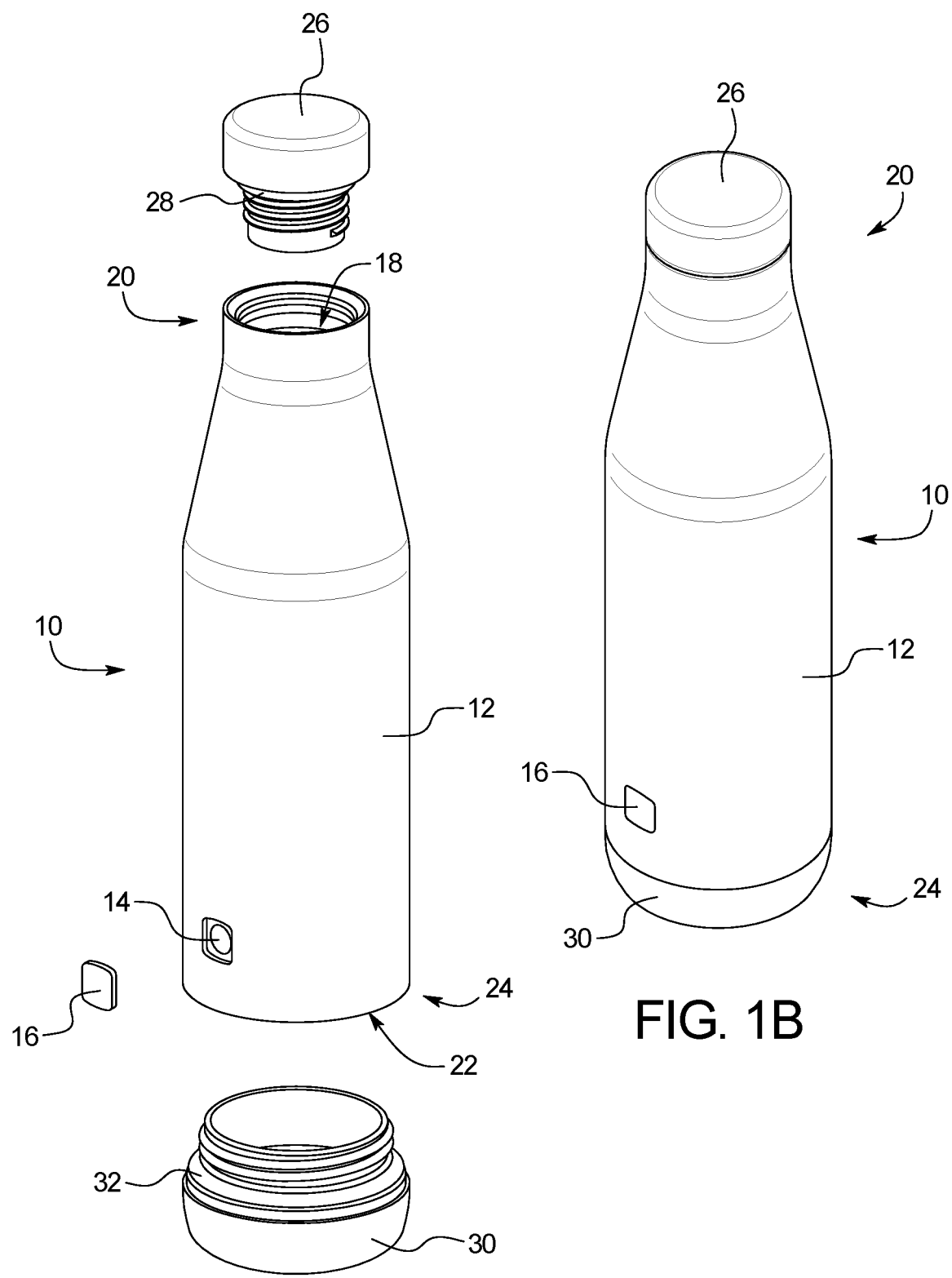
FIG. 1A is an exploded perspective view of a stainless steel double wall vacuum container.
FIG. 1B is an assembled perspective view of the container shown in FIG. 1A.

The drawing figures depict one or more implementations in accord with the present concepts, by way of example only, not by way of limitations.

DETAILED DESCRIPTION OF THE INVENTION

FIGS. 1A and 1B illustrate a first example of a dual removable end cap vessel 10. As shown in FIGS. 1A and 1B, the vessel can be a container such as a bottle. In the example shown in FIGS. 1A and 1B, the vessel 10 includes a double wall vacuum insulated body 12 including a vacuum port 14 and vacuum port cover 16. The body 12 further includes a mouth 18 at the top end 20 of the body 12 and a base opening 22 located at a bottom end 24 of the body 12. A removable top cap 26 includes a top seal 28 that seals the mouth 18. A removable bottom cap 30 includes a bottom seal 32 that seals the base opening 22.

As shown in the exploded view in FIG. 1A, when the vessel 10 is opened at both ends, a pressurized stream of water entering the body 12 through either the mouth 18 or the base opening 22 has a clear path to exit the body 12 through the other end. This makes the vessel 10 significantly easier to clean in a dishwasher. As shown in FIG. 1B, when both the top cap 26 and the bottom cap 30 are secured to the body 12, the vessel 10 is a fully sealed, insulated beverage container.

Figure 2C:
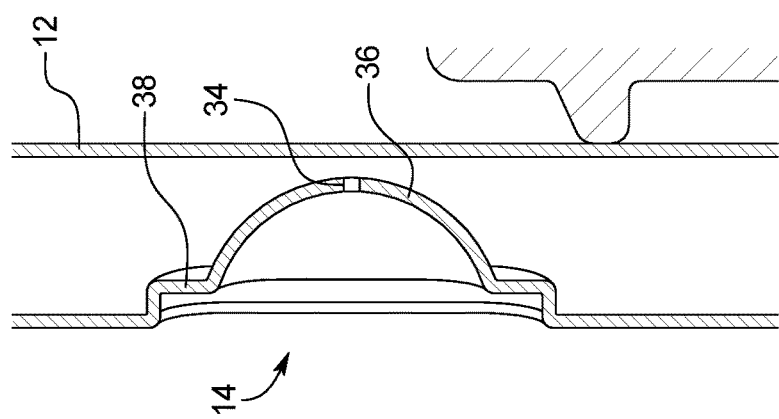
FIG. 2C is a cross-sectional detail of the view shown in FIG. 2B.
Figure 2B:
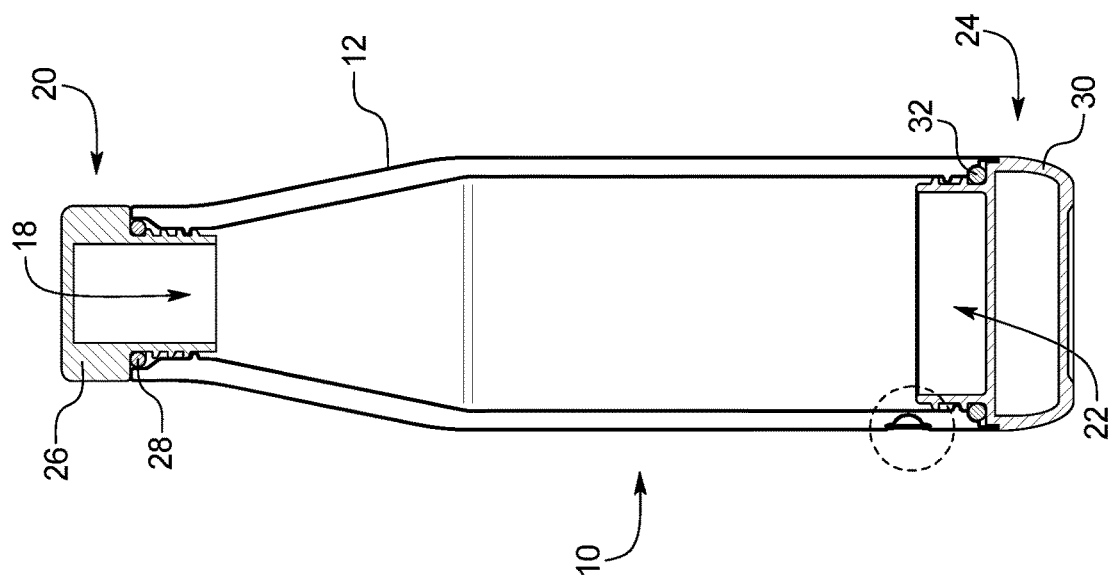
FIG. 2B is a cross-sectional view of the container shown in FIG. 2A.
Figure 2A:
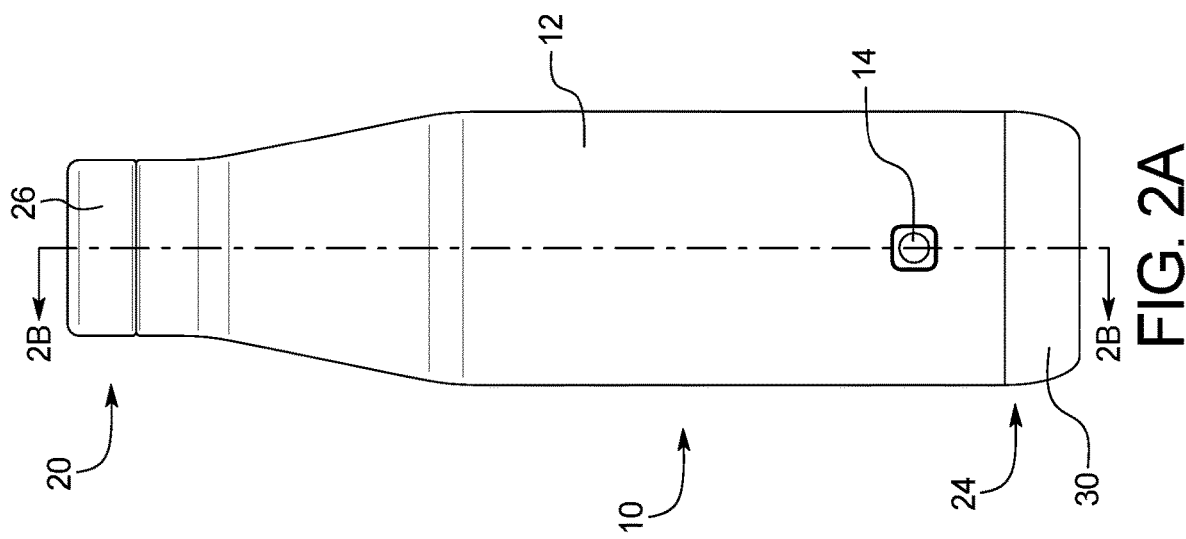
FIG. 2A is a side view of the container shown in FIG. 1A.

FIGS. 2A, 2B, and 2C illustrate additional views of the vessel 10 shown in FIGS. 1A and 1B. As shown in FIG. 2A, the vacuum port 14 is located along the side of the body 12. As shown in FIGS. 2B and 2C, the vacuum port 14 includes a vacuum hole 34 that, when unsealed, enables fluid communication from within the double wall structure to the ambient atmosphere. In the example shown, the vacuum hole 34 is located within a recessed bowl 36 toward the interior of the body 12 beneath a seating rim 38 that mates with the vacuum port cover 16 to cover up (or mask) the sealed vacuum hole 34. The vacuum hole 34 and its location along the body 12 are critical to providing the double wall vacuum insulated body 12 and to the manufacturing process for making the double wall vacuum insulated body 12, as described further herein.

Figures 3A, 3B:
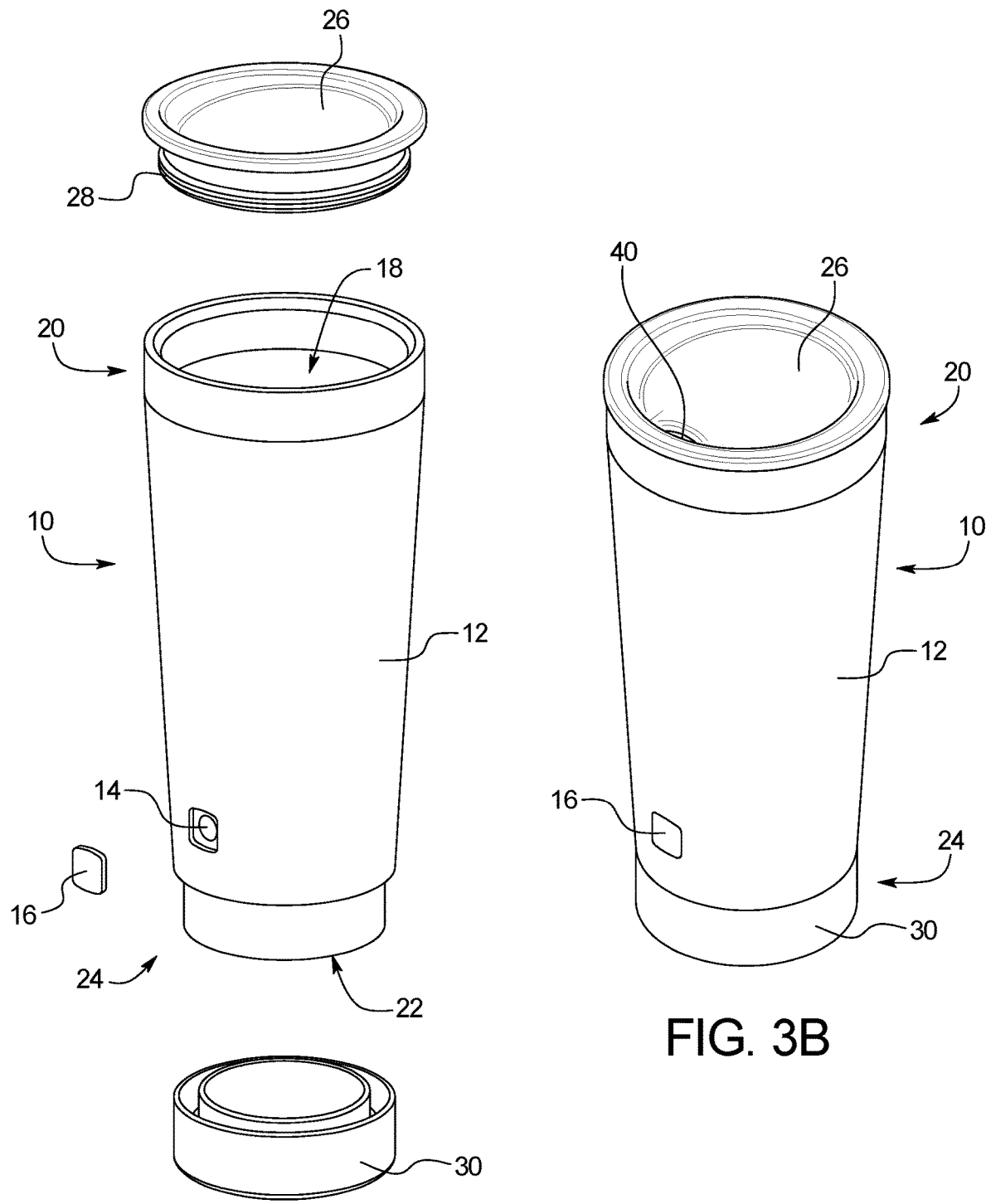
FIG. 3A is an exploded perspective view of another example of a stainless steel double wall vacuum container.
FIG. 3B is an assembled perspective view of the container shown in FIG. 3A.

FIGS. 3A and 3B illustrate a second example of a dual removable end cap vessel 10. As shown in FIGS. 3A and 3B, the vessel can be a container such as a tumbler. Like FIGS. 1A and 1B, in the example shown in FIGS. 3A and 3B, the vessel 10 includes a double wall vacuum insulated body 12 including a vacuum port 14 and vacuum port cover 16. The body 12 further includes a mouth 18 at the top end 20 of the body 12 and a base opening 22 located at a bottom end 24 of the body 12. A removable top cap 26 includes a top seal 28 that seals the mouth 18. A removable bottom cap 30 includes a bottom seal 32 (FIG. 4B) that seals the base opening 22.

As shown in the exploded view in FIG. 3A, when the vessel 10 is opened at both ends, a pressurized stream of water entering the body 12 through either the mouth 18 or the base opening 22 has a clear path to exit the body 12 through the other end. This makes the vessel 10 significantly easier to clean in a dishwasher. As shown in FIG. 3B, when both the top cap 26 and the bottom cap 30 are secured to the body 12, the vessel 10 is an insulated beverage container including an opening 40 for drinking through the top cap 26.

FIGS. 4A, 4B, and 4C illustrate additional views of the vessel 10 shown in FIGS. 3A and 3B. As shown in FIG. 4A, the vacuum port 14 is located along the side of the body 12. As shown in FIGS. 4B and 4C, the vacuum port 14 includes a vacuum hole 34 that, when unsealed, enables fluid communication from within the double wall structure to the ambient atmosphere. In the example shown, the vacuum hole 34 is located within a recessed bowl 36 toward the interior of the body 12 beneath a seating rim 38 that mates with the vacuum port cover 16 to cover up the sealed vacuum hole 34.

In the example of the vessel 10 shown in FIGS. 3A, 3B, 4A, 4B, and 4C, the bottom cap 30 includes an inner body 42 around which the bottom seal 32 is located, and an outer body 44 spaced apart from the inner body 42 to form a channel 46 that receives the base opening 22. In the example shown in FIG. 4B, the bottom seal 32 includes a compressible element located at the bottom of the channel 46 against which the body 12 seals. In other examples, the bottom seal 32 includes at least one compressible element extending from the inner body 42 towards the outer body 44 thereby sealing along the inner surface 50 of the body 12.

Figures 5A, 5B:
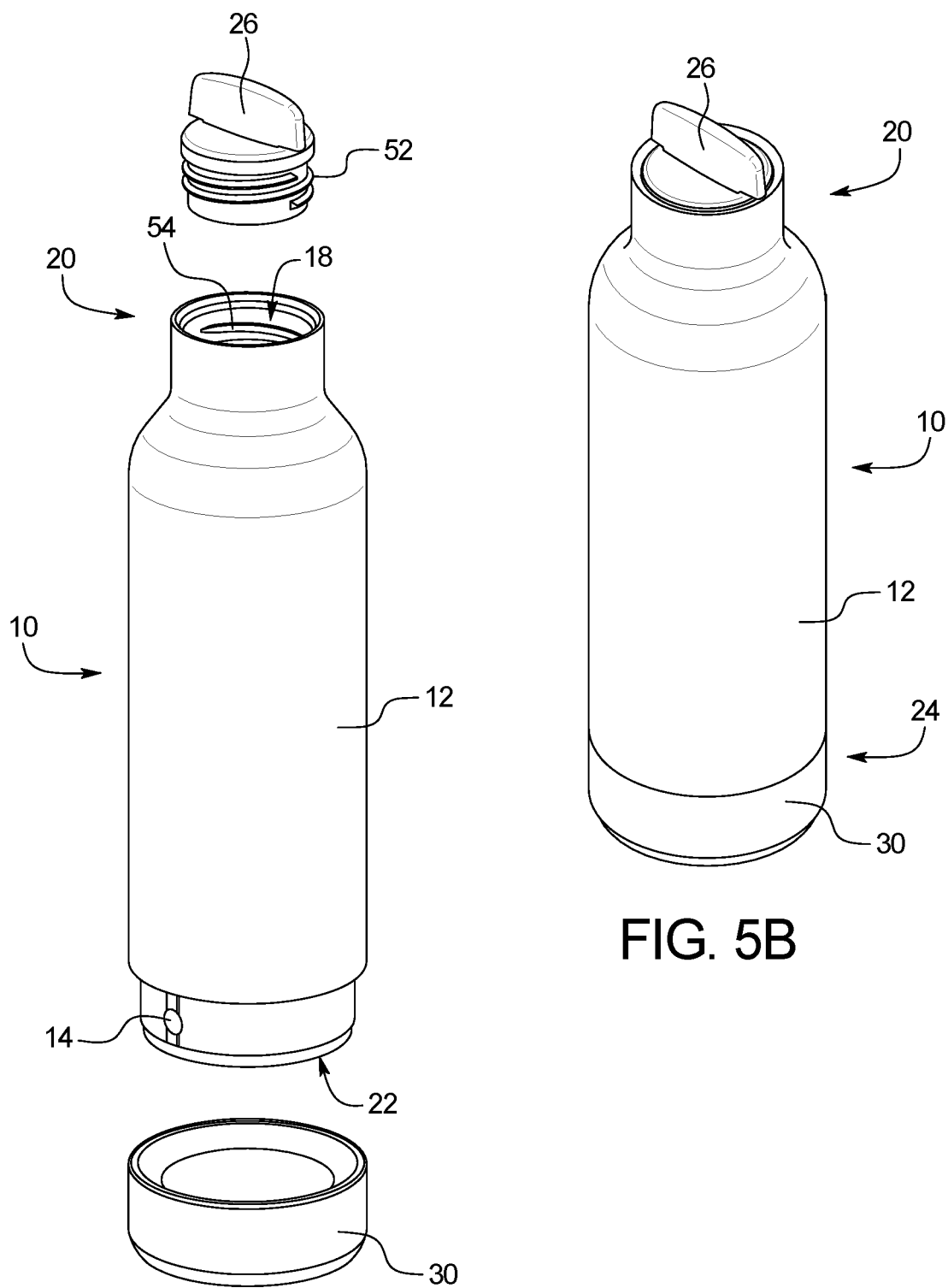
FIG. 5A is an exploded perspective view of another example of a stainless steel double wall vacuum container.
FIG. 5B is an assembled perspective view of the container shown in FIG. 5A.

FIGS. 5A and 5B illustrate a third example of a dual removable end cap vessel 10. As shown in FIGS. 5A and 5B, the vessel can be a container such as a screw top beverage container. Like FIGS. 1A and 1B, as well as 3A and 3B, in the example shown in FIGS. 5A and 5B, the vessel 10 includes a double wall vacuum insulated body 12 including a vacuum port 14. However, this version of the body 12 does not include a separate vacuum port cover 16. The body 12 further includes a mouth 18 at the top end 20 of the body 12 and a base opening 22 located at a bottom end 24 of the body 12. A removable top cap 26 includes a top seal 28 (FIG. 6B) that seals the mouth 18. A removable bottom cap 30 includes a bottom seal 32 that seals the base opening 22. In this example, the top cap 26 is threaded 52 and screws into the mating threads 54 located along the inner surface of the mouth 18. When attached to the body 12, the bottom cap 30 covers the vacuum port 14, eliminating the need for the vacuum port cover 16 used in some of the other examples of vessels 10 taught herein.

As shown in the exploded view in FIG. 5A, when the vessel 10 is opened at both ends, a pressurized stream of water entering the body 12 through either the mouth 18 or the base opening 22 has a clear path to exit the body 12 through the other end. This makes the vessel 10 significantly easier to clean in a dishwasher. As shown in FIG. 5B, when both the top cap 26 and the bottom cap 30 are secured to the body 12, the vessel 10 is a fully sealed, insulated beverage container.

FIGS. 6A, 6B, and 6C illustrate additional views of the vessel 10 shown in FIGS. 5A and 5B. As shown in FIG. 6A, the vacuum port 14 is located along the side of the body 12 near the base opening 22 in a position that is covered when the bottom cap 30 is secured to the body 12. As shown in FIGS. 6B and 6C, the vacuum port 14 includes a vacuum hole 34 that, when unsealed, enables fluid communication from within the double wall structure to the ambient atmosphere. In the example shown, the vacuum hole 34 is located within a recessed bowl 36.

In the example of the vessel 10 shown in FIGS. 5A, 5B, 6A, 6B, and 6C, the bottom cap 30 includes an inner body 42 around which the bottom seal 32 is located, and an outer body 44 spaced apart from the inner body 42 to form a channel 46 that receives the base opening 22. In some examples, the bottom seal 32 includes at least one compressible element 48 at the bottom of the channel 46 against which the base opening 22 engages thereby sealing the body 12.

In the example of a vessel 10 shown in FIGS. 5A, 5B, 6A, 6B, and 6C, the vacuum port 14 is covered by the outer body 44 of the removable bottom cap 30 when the bottom cap 30 is attached to the body 12. This version of the vessel 10 may provide a cleaner look to the exterior of the body 12 since neither the vacuum port 14, nor a related vacuum port cover 16, are visible to a user when the bottom cap 30 is attached to the body 12.

As shown in the various examples of the vessel 10 illustrated in FIGS. 1A-6C, the vessel 10 can take various forms including, narrow mouth bottles, tumblers, and more. The range of examples provided are merely illustrative. Those with ordinary skill in the art will recognize the wide range of designs that may incorporate the innovative teachings herein. For example, the mouth 18 may be a smaller diameter than the base opening 22, may be a larger diameter than the base opening 22, or may be the same size as the base opening 22. In some examples, the body 12 includes a shoulder 58 that tapers to a narrower diameter towards the mouth 18 and a larger diameter towards the base opening 22. For example, the sealing mechanisms may be adapted and interchanged between embodiments, the top cap 26 of one embodiment may be mixed with the bottom cap 30 of another and so on.

In each of the examples shown in FIGS. 1A-6C, the body 12 is primarily or entirely formed from stainless steel. However, it is contemplated that the body may be formed from other materials that would function as an insulator, specifically when enclosing a vacuum chamber between the double wall structure.

One uniqueness of the vessel 10 taught herein is that it provides a double wall vacuum insulated body 12 with a removeable top cap 26 (i.e., lid) and removable bottom cap 30 (i.e., base). As noted, being able to remove both the top cap 26 and the bottom cap 30 provides exceptional access to the interior of the vessel 10. This is important both during the manufacturing process as well as when using the final product. For example, in addition to the benefits of making the vessel 10 easier to clean, being able to remove the top cap 26 and the bottom cap 30 during the manufacturing process makes it easier to polish the interior surface of the vessel 10 using traditional polishing methods. Alternatively, a temporary steel cap may be placed on either end of the vessel 10 and the interior surface of the vessel 10 may be electroplated, as is typical with double wall vacuum insulated vessels that do not have two removeable end caps.

The double wall body 12 provides insulation when a vacuum is pulled between the walls of the body 12 and the vacuum port 14 is sealed. In a primary embodiment, the top cap 26 and bottom cap 30 are not a double wall vacuum insulated design (though they certainly could be). In a primary embodiment, both the top cap 26 and bottom cap 30 are insulated using an expanded polystyrene foam or similar insulating material. However, it is contemplated that the top cap 26 and bottom cap 30 may be insulated, or non-insulated, in any manner that will be recognized by those skilled in the art.

Turning to FIGS. 7A-8E, systems and processes are described for effectively turning the double walled stainless steel bodies 12 into vacuum insulated double walled stainless steel bodies 12. However, it is important to note that special fixturing is not necessary to create the vessels 10 described herein. Although not using special fixturing makes the process more difficult and error-prone, because the vessels 10 may be able to roll around if not fixed in place, if the vessels 10 are packed together so as to minimize their movement, the processes described herein may still work to an acceptable degree.

The new vessel 10 design described with reference to FIGS. 1A-6C requires a new method of manufacture in which a plurality of vessels 10 may be securely positioned on their sides during the vacuum drawing process. Accordingly, the FIGS. 7A-8E illustrate examples of fixtures 56 (e.g., a racks) for aligning and holding the vessels 10 in place during this process.

Figure 7A:
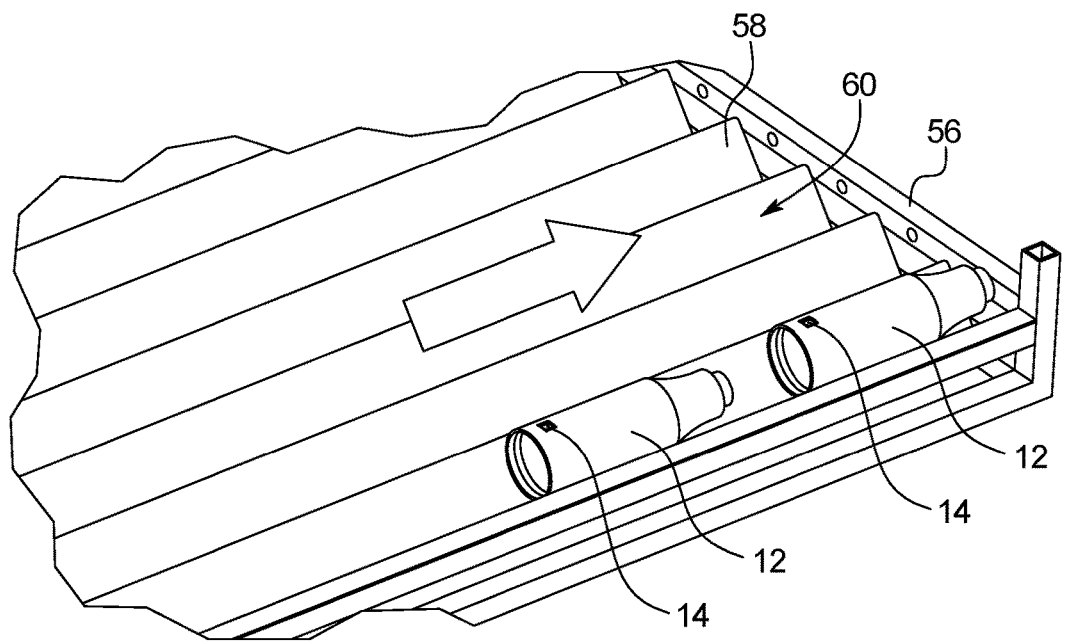
FIG. 7A is a perspective view of two of the containers being nested together on a fixture.

For example, as shown in FIG. 7A a vacuum rack fixture 56 securely aligns a plurality of bodies 12 on their sides (i.e., horizontally) during the vacuum drawing process with their vacuum ports 14 facing upward. In a first example, a rack fixture 56 is provided with sheet metal (or wire mesh or other structural material) shelves 58 that include rows of channels 60 onto which the bodies 12 are aligned. The channels 60 help keep the bodies 12 in place and aligned. However, the shelf 58 may be alternatively configured without channels 60 to provide a surface onto which a series of bodies 12 may be supported and held in place.

Figure 7B:
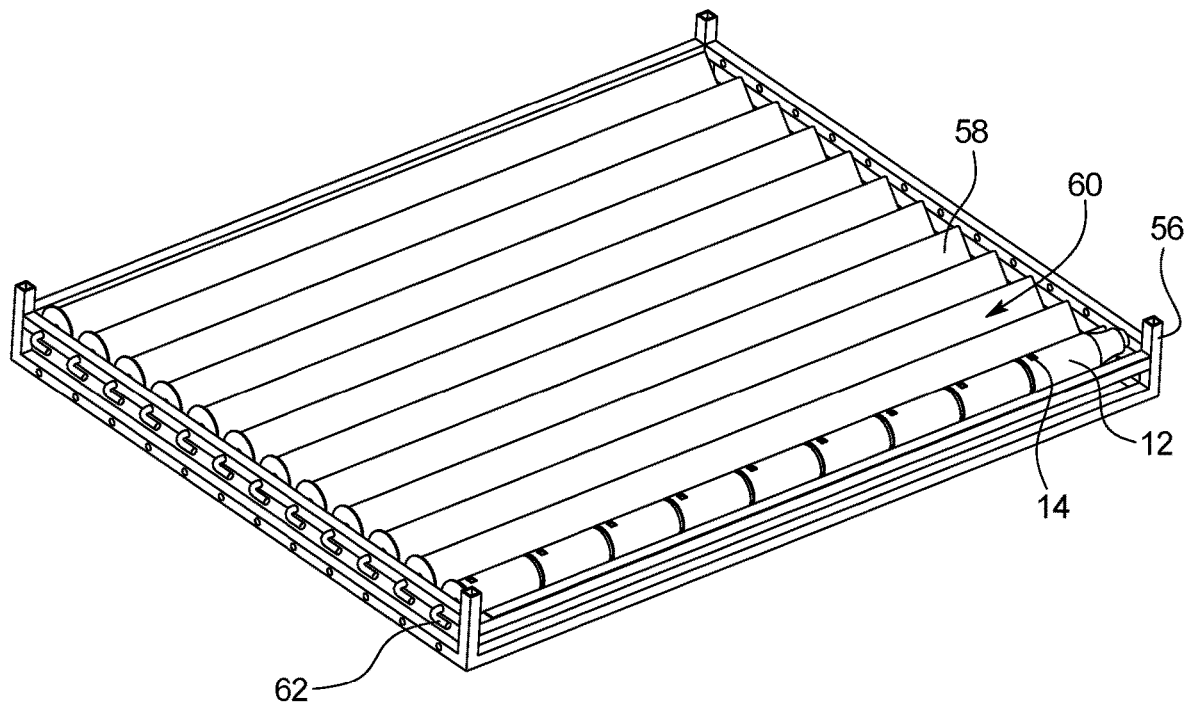
FIG. 7B is a perspective view of a full row of containers nested together on the fixture shown in FIG. 7A.

FIG. 7B shows a full row of bodies 12 aligned in a channel 60 on a shelf 58 of a rack fixture 56. As shown, the bodies 12 are nested along each channel 60, with the open vacuum port 14 aligned to face upward. The position of the vacuum port 14 is important because, in a preferred version of the process, the force of gravity is used to ensure the melting melt beads seal the vent holes 34 of their respective vacuum ports 14 when the rack fixture 56 and its contents are heated.

FIG. 7C illustrates an end cap 62, including a plate 64 and a threaded shaft 66. As shown in FIG. 7C, one or more end caps 62 can be used to secure the bodies 12 in position along each of the channels 60 in the rack fixture 56. The threaded shaft 66 engages the rack fixture 56 such that the plate 64 of the end cap 62 can be tightened against the row of bodies 12 to hold them securely in place and in position on the rack fixture 56.

Once the bodies 12 are secured with their vacuum ports 14 properly aligned, the rack fixture 56 holding the bodies 12 can be processed to create the vacuum insulation between the double wall structure of the bodies 12. For example, a melt bead may be placed on top of each vacuum port 14 such that the melt bead does not completely block air from leaving the space from within the double wall body 12. Then when the bodies 12 on the rack fixture 56 are heated (with or without an additional vacuum being pulled in the environment in which the rack fixture 56 is located to increase the vacuum effect), the melt beads melt to seal the vacuum hole 34 of the respective vacuum ports 14.

FIG. 7D shows that a plurality of rack fixtures 56 may be stacked on top of each other such that an even greater number of bodies 12 can be processed at one time.

FIGS. 8A-8F illustrate another example of a rack fixture 56 that can be used to secure the bodies 12 in place during the vacuum making process. In the example shown in FIGS. 8A-8F, the rack fixtures 56 use a series of rods 68 onto which the bodies 12 are loaded and held in place. As the bodies 12 are loaded onto the rods 68, end caps 62 may be used to secure the bodies 12 on the rods 68. As shown, the plate 64 of a first end cap 62 may rest against the mouth 18 of the body 12 at the front of the stack and the plate 64 of a second end cap 62 may rest against the base opening 22 of the body 12 at the back of the stack. A nut 70 may be used to tighten each end cap 62 onto each rod 68 to hold the bodies 12 in place. Accordingly, an end cap 62 may be used at one end or both ends of each rod 68 such that the end cap(s) 62 may be tightened against the row of bodies 12 to secure the entire row in place and hold the bodies 12 with their vacuum ports 14 aligned, as desired.

Turning now to FIG. 8D, the end 72 of each rod 68 may be shaped in such a manner that when it is mated in a corresponding cutout 74 in the rack fixture 56 it is held in place and prevented from rotating. For example, as shown in FIG. 8D, the end 72 of the rod 68 may include two flat sides and a rounded top and bottom and the cutout 74 in the rack fixture 56 may have a corresponding rounded bottom and flat sides. Thus, when the end caps 62 hold the bodies 12 on the rod 68 in the correct position and the end 72 is slotted into the corresponding cutout 74, the rod 68 is unable to rotate and the bodies 12 remain in the correct position throughout the vacuum process. In another example, the end 72 may have a square cross-section and the cutout 74 may be a square shaped cutout. Then, when the rods 68 are securely fit in the rack fixture 56, they are prevented from rotating. Of course, other keyed shapes may be used to prevent rotation or otherwise secure such rods 68 in place along the rack fixtures 56.

Figure 8A:
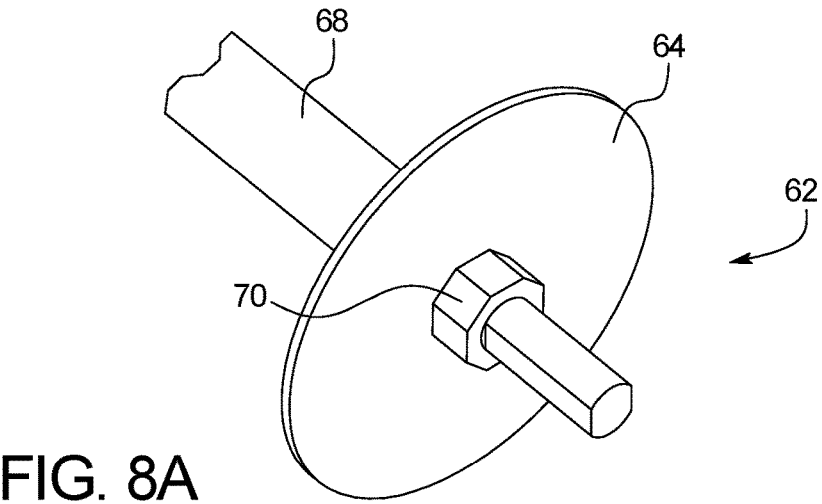
FIG. 8A is a perspective view of another embodiment of an end plate threaded onto a rod.
Figure 8B:
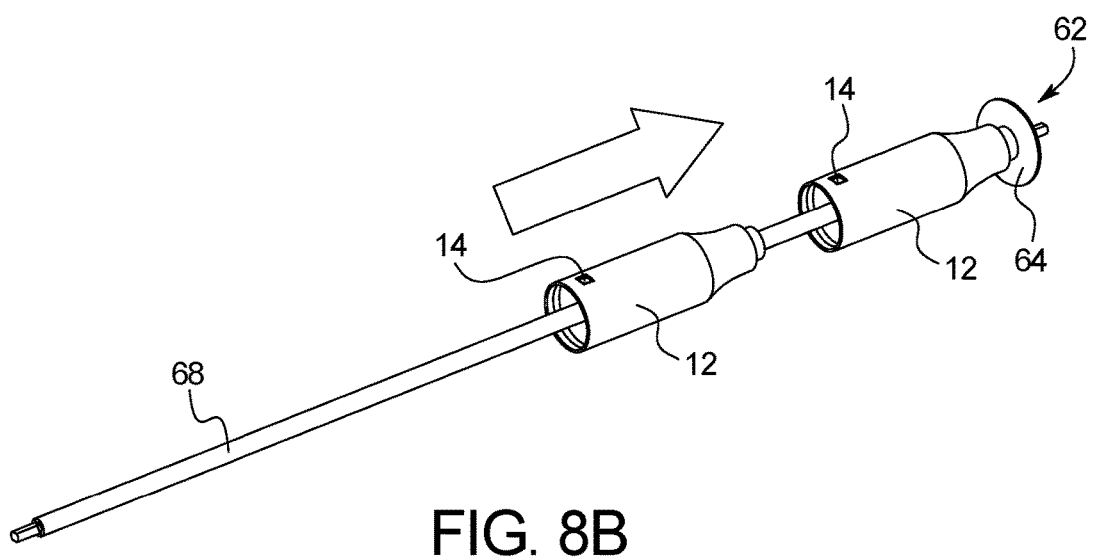
FIG. 8B is a perspective view of two containers nesting into each other on the rod shown in FIG. 8A.
Figure 8C:
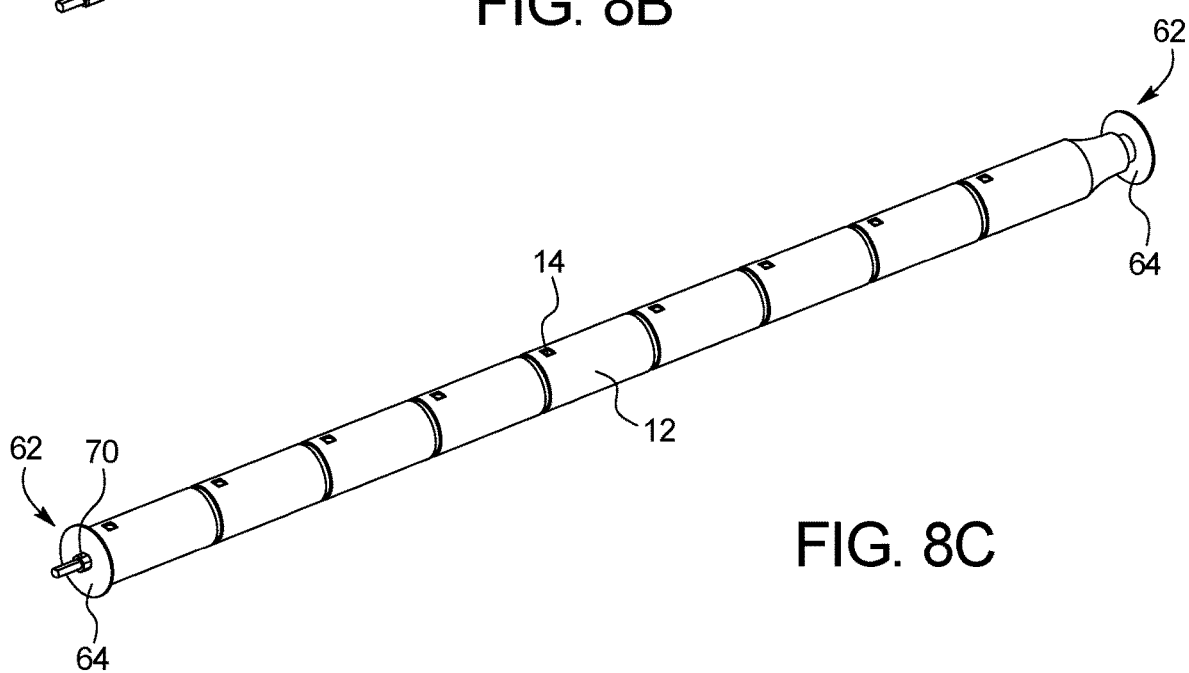
FIG. 8C is a perspective view of a second endplate screwed onto the rod shown in FIG. 8B to hold a row of containers nested into each other.
Figure 8E:
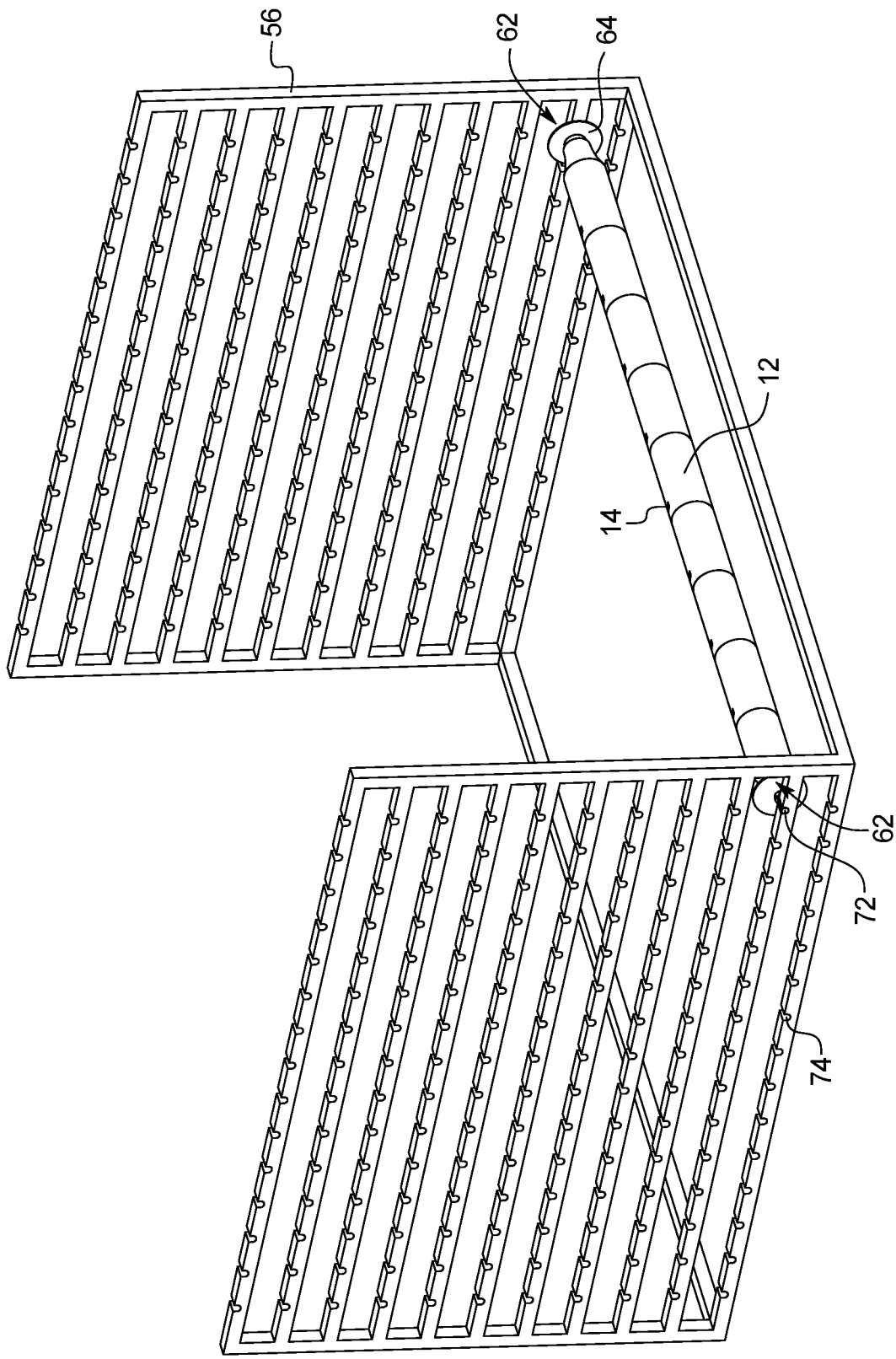
FIG. 8E is a perspective view of a single rod of containers held on the fixture shown in FIG. 8D.
Figure 8F:
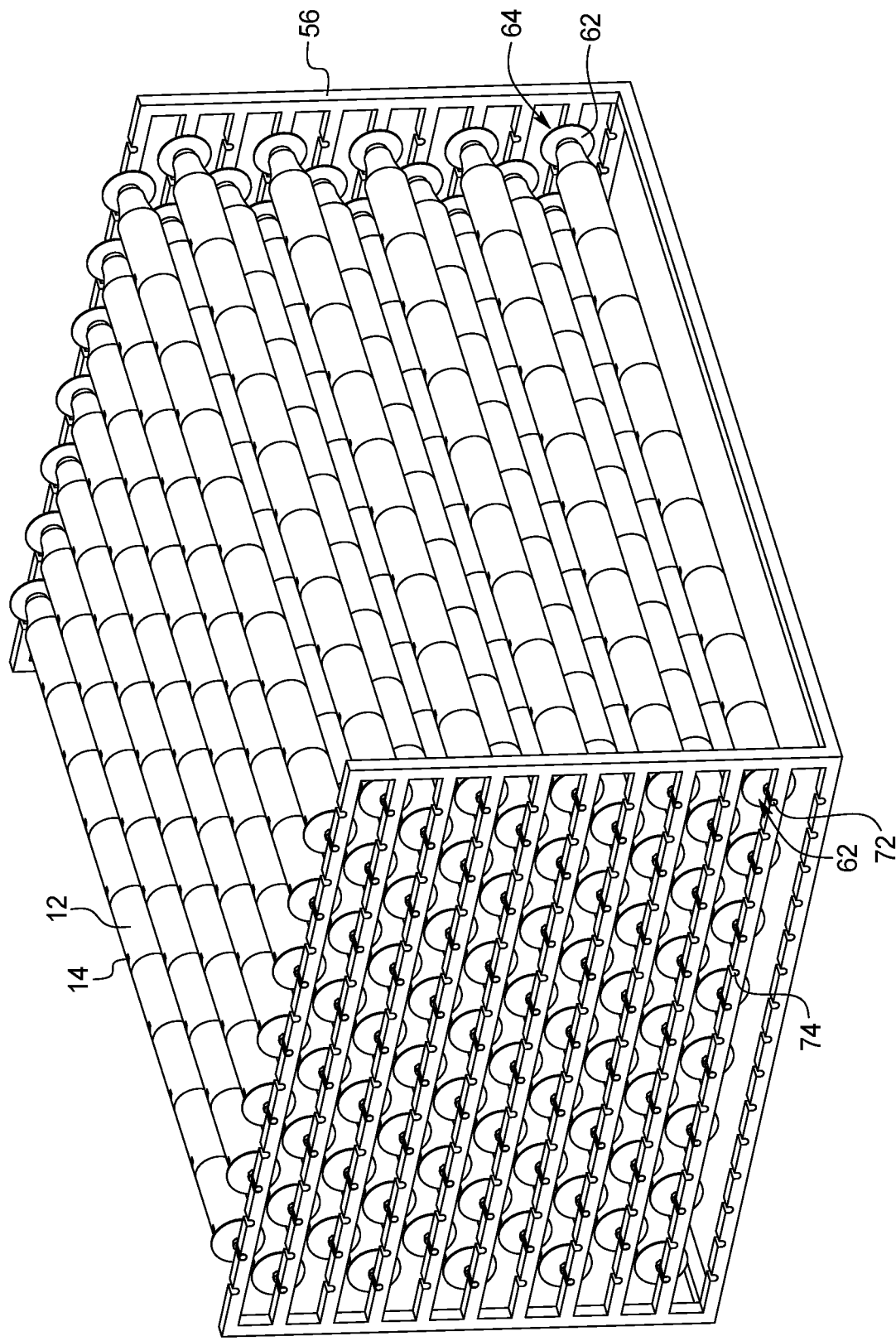
FIG. 8F is a perspective view of a plurality of rods of containers held on the fixture shown in FIG. 8E.

FIG. 8E shows a single rod 68 loaded with bodies 12 with a pair of end caps 62 holding the bodies 12 such that the vacuum port 14 face upward on a rack fixture 56. FIG. 8F shows a plurality of rods 68 loaded with bodies 12, each with a pair of end caps 62 holding the bodies 12 such that the vacuum port 14 face upward on a rack fixture 56.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

What is claimed is:

1. A container comprising:
    a double wall vacuum insulated body comprising:
        an electroplated stainless steel inner surface or a polished stainless steel inner surface;
        an outer surface including a vacuum port;
        a vacuum cavity defined between the inner surface and the outer surface;
        a mouth located at a top end of the double wall vacuum insulated body, the mouth having a mouth diameter; and
        a base opening located at a bottom end of the double wall vacuum insulated body, the base opening having a base opening diameter, wherein radially internally facing threads are provided on the inner surface of the double wall vacuum insulated body adjacent the bottom end thereof;
    a removable top cap including a top seal that seals the mouth; and
    a removable bottom cap including a bottom seal that seals the base opening, wherein the bottom cap includes an inner body and an outer body spaced apart from the inner body to form a channel that receives the bottom end of the double wall vacuum insulated body, a bottom seal located at a base of the channel, and wherein the bottom cap has radially outwardly facing threads on the inner body to mate with the radially internally facing threads of the double wall vacuum insulated body.

2. The container of claim 1 wherein the bottom seal includes at least one compressible element extending from the inner body towards the outer body thereby sealing against the bottom end of the double wall vacuum insulated body.

3. The container of claim 1 wherein the vacuum port is covered by the outer body of the removable bottom cap when the removable bottom cap is attached to the double wall vacuum insulated body.

4. The container of claim 1 wherein the mouth diameter is smaller than the base opening diameter.

5. The container of claim 1 wherein the double wall vacuum insulated body includes a shoulder that tapers to a narrower diameter towards the mouth and a larger diameter towards the base opening.

6. The container of claim 1 wherein a pressurized stream of water entering the double wall vacuum insulated body through either the mouth or the base opening has a clear path to exit the double wall vacuum insulated body through the other when the top cap and bottom cap are each removed from the double wall vacuum insulated body.

7. A container comprising:
    a double wall vacuum insulated body comprising:
        an inner surface;
        an outer surface connected to the inner surface at a top of the inner surface;
        a vacuum cavity defined between the inner surface and the outer surface;
        the outer surface having a recessed bowl and a vacuum port in the recessed bowl, the vacuum port providing access to the vacuum cavity;
        a mouth located at a top end of the double wall vacuum insulated body, the mouth having a mouth diameter; and
        a base opening located at a bottom end of the double wall vacuum insulated body, the base opening having a base opening diameter, wherein radially internally facing threads are provided on the inner surface of the double wall vacuum insulated body adjacent the bottom end thereof;
    a removable top cap including a top seal that seals the mouth; and
    a removable bottom cap including a bottom seal that seals the base opening, wherein the bottom cap has radially outwardly facing threads to mate with the radially internally facing threads of the double wall vacuum insulated body.

* * * * *